United States Patent
Simpson

[19]
[11] Patent Number: 6,117,033
[45] Date of Patent: Sep. 12, 2000

[54] HYDRAULIC TENSIONER WITH TUNED SPRING PISTON

[75] Inventor: Roger T. Simpson, Ithaca, N.Y.

[73] Assignee: BorgWarner Inc., Troy, Mich.

[21] Appl. No.: 09/324,157

[22] Filed: Jun. 2, 1999

Related U.S. Application Data

[60] Provisional application No. 60/101,192, Sep. 21, 1998.

[51] Int. Cl.$^7$ ..................................................... F16H 7/08
[52] U.S. Cl. ............................................................. 474/110
[58] Field of Search ................................ 474/109, 110, 474/138

[56] References Cited

U.S. PATENT DOCUMENTS

| | | | |
|---|---|---|---|
| 4,792,322 | 12/1988 | Goppelt et al. | 474/136 |
| 4,826,470 | 5/1989 | Breon et al. | 474/110 |
| 4,850,941 | 7/1989 | Sosson | 474/110 |
| 5,181,889 | 1/1993 | Maruyama et al. | 474/110 |
| 5,352,159 | 10/1994 | Suzuki et al. | 474/110 |
| 5,700,213 | 12/1997 | Simpson et al. | 474/110 |
| 5,707,309 | 1/1998 | Simpson | 474/110 |
| 5,709,625 | 1/1998 | Nakakubo et al. | 474/110 |
| 5,993,339 | 11/1999 | Poiret | 474/109 |

*Primary Examiner*—Rodney H. Bonck
*Attorney, Agent, or Firm*—Sidley & Austin; Greg Dziegielewski

[57] ABSTRACT

A hydraulic tensioner includes a cylindrical center member or mass to counteract the resonance of the piston. The center member is located between a pair of piston springs inside the fluid chamber. The mass of the center member is selected, along with the spring rates of the piston springs, so that the resonant frequency of the center member matches the resonant frequency of the piston and timing drive. Since the center member moves in the opposite direction from the piston, the center member counteracts or damps the movement of the piston at resonant frequencies.

10 Claims, 1 Drawing Sheet

HYDRAULIC TENSIONER WITH TUNED SPRING PISTON

This application claims benefit of provisional application U.S. Ser. No. 60/101,192, filed Sep. 21, 1998.

BACKGROUND OF THE INVENTION

This invention relates to a hydraulic tensioner having tuned piston spring to damp or counteract the motion of the piston at resonant frequencies. More particularly, this invention relates to a hydraulic tensioner in which a large cylindrical mass is interposed between two portions of a piston spring in the inside of the hollow piston of the tensioner.

The piston of a hydraulic tensioner moves inward and outward at the frequency of the engine timing drive. At certain speeds, the piston moves at the resonant frequency of the timing drive. Resonance frequencies cause extreme movements of the piston. The present invention utilizes a solid mass in the center of the spring of the piston to counteract the resonance of the piston. The spring and center member are tuned to resonate at the same resonance frequency of the piston. However, the center member moves in the opposite direction of the piston and thus serves to damp or counteract the extreme movements of the piston when the piston reaches the resonance condition.

The cylindrical center member is inserted between two portions of the spring inside the piston. Thus, the center member serves to reduce the volume of the fluid chamber inside the piston. This reduction in volume decreases the time necessary to purge the air from the piston during engine and tensioner start-up conditions.

A tensioning device, such as a hydraulic tensioner, is used as a control device for a power transmission chain as a chain travels between a plurality of sprockets. As a chain transmits power from a driving sprocket to a driven sprocket, one portion or strand of the chain between the sprockets will be tight while the other portion of the chain will be slack. In order to impart and maintain a certain degree of tension in the slack portion of the chain, a hydraulic tensioner provides a piston that presses against a tensioner arm or other chain guiding mechanism.

Prevention of excess slack in the chain is particularly important in the case of a chain driven camshaft in an internal combustion engine in that a chain without sufficient tension can skip a tooth or otherwise throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tension. Reverse rotation of an engine, occurring for example in stopping or in failed attempts at starting, can also cause fluctuations in chain tension. For these reasons, a mechanism such as a hydraulic tensioner is desired to ensure the necessary tension on the slack side of the chain.

Hydraulic tensioners are a common method of maintaining proper chain tension. In general, these devices employ a tensioner arm or lever arm that pushes against the chain on the slack side of the chain. This lever arm must push toward the chain, tightening the chain when the chain is slack, and must provide resistive force when the chain tightens.

Typically, a hydraulic tensioner includes a piston in the form of a hollow cylinder. The piston slides within a bore in the housing and is biased outward from the housing in the direction of the tensioner arm and chain by a piston spring. The interior of the piston forms a high pressure fluid chamber with the bore or opening in the housing. The high pressure chamber is connected through a one way check valve to a low pressure chamber or reservoir, which provides or is connected to an exterior source of hydraulic fluid.

Upon start-up, the force of the spring on the piston causes the piston to move further outward as the chain begins to move. Outward movement of the piston creates a low pressure condition in the high pressure fluid chamber, or pressure differential across the inlet check valve. Accordingly, the inlet check valve opens and permits the flow of fluid from the reservoir, or low pressure chamber, into the high pressure chamber. When the high pressure chamber is sufficiently filled with fluid, the force on the chain that moves the piston inward will be balanced by the outward force from the spring and the resistance force of the fluid in the chamber. The force of the chain against the fluid in the chamber also causes the check valve to close, which prevents further addition of fluid to the chamber.

Various types of hydraulic tensioners are described in Suzuki et al., U.S. Pat. No. 5,352,159, Goppett et al., U.S. Pat. No. 4,792,322, and Sosson U.S. Pat. No. 4,850,941. The hydraulic tensioner of Sosson U.S. Pat. No. 4,850,941, has a check valve mounted in the piston, providing a relatively small high pressure chamber. The high pressure chamber is defined by part of the cavity formed in the housing and the piston. The tensioner does not have a spring between the body and the piston or a means for permitting discharge of air from the chamber.

U.S. Pat. No. 4,826,470 discloses a hydraulic tensioner with a check valve mounted in the nose of a piston. The check valve permits air to escape from the piston. U.S. Pat. No. 4,507,103 discloses a hydraulic tensioner with a check valve and vent in series. The check valve has a low opening pressure so that fluid flows from the high pressure chamber through the check valve and then to the tortuous vent path to atmosphere.

SUMMARY OF THE INVENTION

The present invention is directed to a hydraulic tensioner with a solid mass, or center member, in the center of the spring of the piston to counteract the resonance of the piston. The spring and center member are tuned to resonate at the same resonance frequency as the resonance frequency of the piston. However, the center member moves in the opposite direction of the movement of the piston and thus serves to damp or counteract the extreme movements of the piston when the piston reaches the resonance condition.

The cylindrical center member is inserted between two portions of the spring inside the piston. Thus, the center member serves to reduce the volume of the fluid chamber inside the piston. This reduction in volume decreases the time necessary to purge the air from the piston during engine and tensioner start-up conditions.

In one embodiment, the hydraulic tensioner includes a housing with a central bore. A hollow plunger or piston is slidably received within the bore. A source of pressurized fluid, or reservoir, is formed outside of the hollow piston. A one-way check valve is mounted in the base or open end of the piston. A high pressure fluid chamber is formed in the area formed by the hollow piston and the bore. A one-way check valve permits fluid flow from the reservoir into the high pressure chamber of the piston and restricts flow in the reverse direction out of the piston.

Upon outward movement of the piston by the spring, a pressure differential forms across the check valve and fluid flows from the reservoir or other fluid source and through the check valve into the high pressure chamber. The piston moves outward until the inward force on the piston from the chain is balanced by the outward resistance force of the spring and resistance force from the fluid in the high pressure chamber.

For a better understanding of these and other aspects and objects of the invention, references should be made to the following detailed description taken in conjunction with the accompanying drawings.

DETAILED DESCRIPTION OF THE PREFERRED EMBODIMENTS

Figure 1:
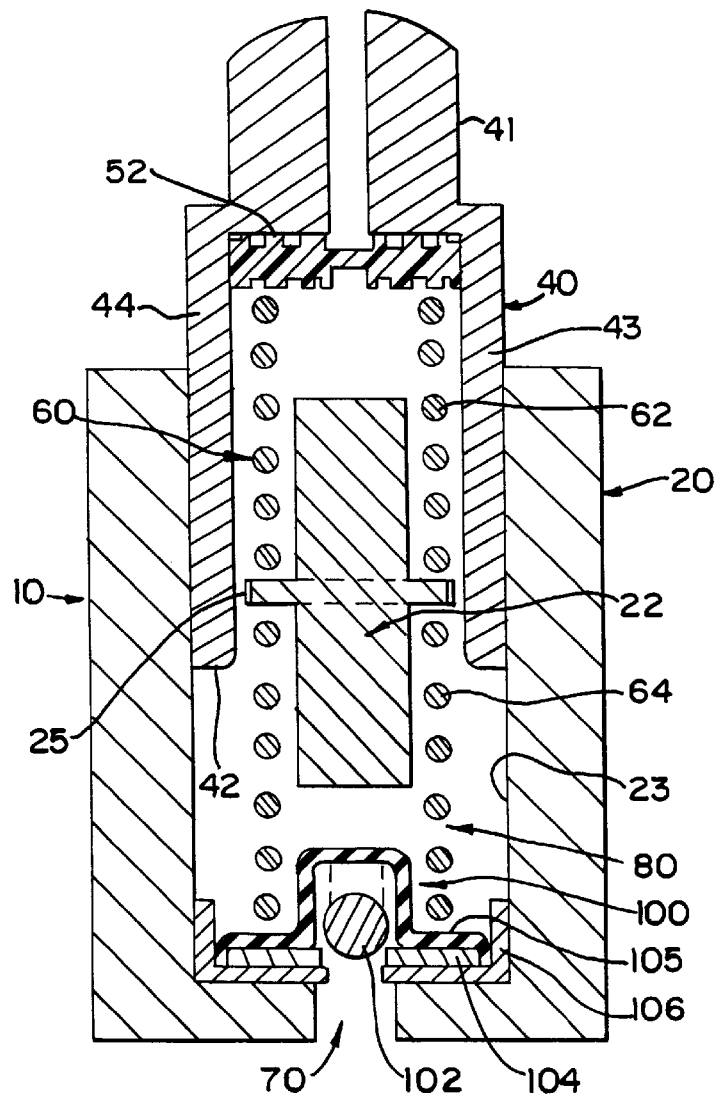
FIG. 1 is a sectional view of the preferred embodiment of the hydraulic tensioner of the present invention illustrating the cylindrical center member located inside the piston spring.

Turning now to the drawings, the present invention is directed to a hydraulic tensioner with a cylindrical mass or center member located in the center of the piston. The tensioner 10 includes a generally cylindrical, hollow piston 40 that is slidably received in a bore 23 in a housing 20. A one-way check valve 100 is mounted at the bottom of the housing. The check valve forms a high pressure fluid chamber between the check valve and the interior of the piston and bore.

The piston is biased outward from the bore by a piston spring 60. The spring is mounted within the high pressure fluid chamber 80 on the inside of the piston. The piston spring 60 is formed in two parts or portions 62, 64. The cylindrical center member 22 is placed between the two spring parts. The cylindrical center member 22 is preferably solid and of generally cylindrical shape, with a radially extending flange 25 member, which separates the two portions of the spring.

Hydraulic fluid is supplied from an external source of pressurized fluid to the piston through an aperture 70 in the housing 20 and then through the check valve 100. The check valve regulates the flow of hydraulic fluid from a reservoir or other source of pressurized fluid into the high pressure chamber while preventing flow in the reverse direction.

FIG. 1 illustrates one embodiment of the present invention. The hydraulic tensioner 10 includes both a piston spring and a check valve. The tensioner 10 includes a cylindrical housing 20 having a bore 23 in its center to provide an opening for the piston. The housing may be a cartridge housing having threads on the outside of the housing so that it can be received in a threaded bore in the engine block.

A hollow cylindrical piston, or plunger, 40 is slidably mounted concentrically in the bore 23 of the housing. The hollow cylindrical piston 40 has an upper end 41, a lower end 42, and sides 43 and 44. A one-way check valve 100 is mounted in the lower end of the housing. A high pressure fluid chamber 80 is formed between the check valve and the interior of the piston and bore. The size of the high pressure chamber 80 increases as the piston moves outward.

Figure 4:
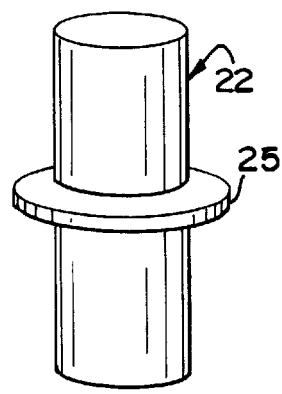
FIG. 4 is a perspective view of another alternate embodiment of the cylindrical center member of the present invention.

A spring 60 biases the piston in an protruding or outward direction from the bore. A first spring portion or first piston spring 64 is mounted inside the housing and rests on the top of the check valve 100. The other end of the first piston spring rests against the bottom surface of the radially extending flange 25. The first spring preferably wraps about or is concentric with the cylindrical center member 22. Flange 25, also shown in FIG. 4, is located at about the midpoint of the center member 22 and extends in a radial direction.

The second piston spring portion or second piston spring 62 is biased between the upper surface of the radially extending flange 25 and the inner surface of a vent valve with a tortuous path which is fit within the top of the piston 40. The second piston spring 62 contacts the inside of vent valve. The spring biases the piston 40 in a protruding or outward direction from the bore 23. The second spring also preferably wraps about or is concentric with the center member. Alternatively, the first and second spring portions may be portions of a single system in which the cylindrical center member is formed integral with the two spring portions.

The cylindrical center member 22 is preferably solid metal. Alternatively, the center member 22 may be hollow or include internal grooves or recesses for holding the piston springs. The mass of the cylindrical center member is sized in order to provide a damping effect that counters the action of the piston under resonance. Thus, the resonant frequency of the spring 60 and mass 22 combination is calculated using standard resonant condition calculations known in the art. The size and mass of the cylindrical center member is designed and constructed so that the resonant frequency for the spring and mass combination will equal the resonant frequency for the piston. Of course, in practice, the resonant frequencies will not necessarily be equal, but will be on generally the same order to have the necessary effect of the invention. By "on the same order," the present invention contemplates frequencies within 10% of one another. Since the mass travels in a direction opposition that of the piston, the movement of the mass under resonant conditions will damp or limit the movement of the piston under those resonant conditions.

The check valve 100 is preferably mounted in the housing opposite the open end of the piston 40. The one way check valve 100 permits the flow of fluid to the (high pressure) fluid chamber 80 from a (low pressure) reservoir or source of pressurized fluid (not shown) when a pressure differential is created across the valve. The check valve 100 preferably includes a ball 102 and spring 103 biasing the ball 102 toward a ball seat 104 away from a bracket or cage 105. A check valve seal 106 is placed at the base of the valve in the housing. Alternatively, the check valve 100 may also be a variable orifice check valve as shown and described in U.S. Pat. No. 5,259,820 and U.S. Pat. No. 5,277,664, both of which are owned by the assignee of the present application and which are incorporated herein by reference. The exact configuration of the check valve will ultimately depend of the dynamic response desired.

The plastic vent with the tortuous path may be of the type disclosed in Hunter et al. U.S. Pat. No. 5,346,436, or Smith U.S. Pat. No. 5,718,650, both of which are incorporated herein by reference. Other types of vents are also possible. Alternatively, the passage in the top of the piston may be made sufficiently small in diameter in order to serve as a vent.

During start-up of the hydraulic chain tensioner 10 at normal operating conditions, a low pressure condition is created in the high pressure chamber 80, which causes fluid to enter through check valve 100 and begin to fill the high pressure chamber 80. The pressure differential across the check valve 100 opens the valve and allows positive fluid flow into the high pressure chamber 80. Once the inward force of the chain on the piston balances the resistance force of the fluid and spring, the check valve 100 closes, and prevents back flow out of the high pressure chamber 80. During operation, the force of the chain against the piston 40 is balanced by the force of the spring 60 and the pressurized fluid in the high pressure chamber 80.

The presence of the cylindrical center member 22 in the center of the piston and fluid chamber serves to reduce the volume of the chamber. In its preferred embodiment, the center member will have a volume that exceeds 50% of the volume of the fluid chamber. Thus, during tensioner start-up conditions, air in the chamber can be easily purged from the chamber through the vent 52 at the top of the piston.

Figure 2:
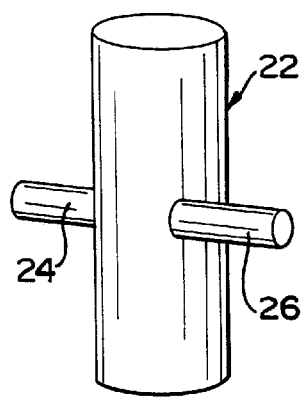
FIG. 2 is a perspective view of the cylindrical center member of the present invention.

Another embodiment is shown in FIG. 2, in which the center member 2 includes a pair of radially extending members 24, 26.

Figure 3:
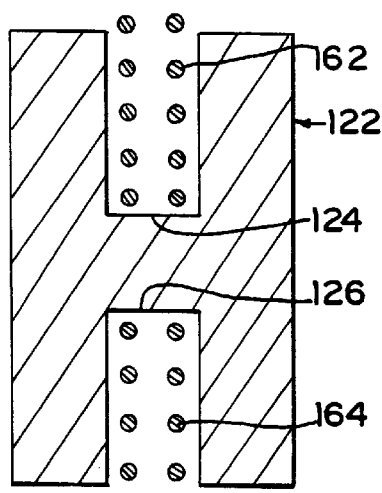
FIG. 3 is a sectional view of one alternate embodiment of the member of the present invention.

Another embodiment is shown in FIG. 3, in which the center member 122 includes a pair of recesses 124, 126 in its center portions. The two piston springs 162, 164 are positioned within the recesses. The remaining structure of the tensioner is the same as the above-described embodiments.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention, is therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:
   a housing having a bore,
   a hollow piston slidably received within said bore, said piston having an upper and a lower end, said lower end having an opening that defines a fluid chamber with said bore,
   a generally cylindrical center member located within said fluid chamber in said bore,
   a first piston spring part located within said fluid chamber, said first piston spring part biasing said cylindrical center member in a protruding direction from said bore,
   a second piston spring part located within said hollow piston, said second piston spring part biasing said piston in a protruding direction from said bore, and
   a check valve provided between the fluid chamber and a source of pressurized fluid, said check valve permitting fluid flow into said fluid chamber while restricting flow in the reverse direction.

2. The hydraulic tensioner of claim 1, wherein said cylindrical center member includes a radially extending flange, said first piston spring part and said second piston spring part contacting said flange.

3. The hydraulic tensioner of claim 2, wherein said second piston spring part is biased between said flange and said piston upper end, said first piston spring part being biased between said flange and said housing.

4. The hydraulic tensioner of claim 1, wherein said cylindrical center member includes a pair of radially extending members, said first piston spring part and said second piston spring part contacting said pair of radially extending members of said cylindrical center member.

5. The hydraulic tensioner of claim 4, wherein said second piston spring part is biased between said pair of radially extending members and said piston upper end, said first piston spring part being biased between said pair of radially extending members and said housing.

6. The hydraulic tensioner of claim 1, wherein said center member has a predetermined mass and each of said piston spring parts has a predetermined spring constant, said predetermined center member mass and said predetermined piston spring constants together defining a first resonant system having a first resonant frequency, said movement of said piston in said housing defining a second resonant system having a second resonant frequency, said first resonant frequency being on the same order of said second resonant frequency.

7. The hydraulic tensioner of claim 1 wherein said fluid chamber defines a first volume, said center member defining a second volume, said second volume being at least 50% of said first volume.

8. The hydraulic tensioner of claim 1, wherein said center member includes a pair of recessed portions, said first and second piston spring parts being located within said recessed portions.

9. The hydraulic tensioner of claim 1, wherein said first piston spring part and said second piston spring part are portions of a single spring.

10. The hydraulic tensioner of claim 1, wherein said first piston spring part is a first piston spring and is separate to said second piston spring part which is a second piston spring.

* * * * *